A. DAHMS.
CUTTER BAR.
APPLICATION FILED SEPT. 18, 1909.
951,985.
Patented Mar. 15, 1910.
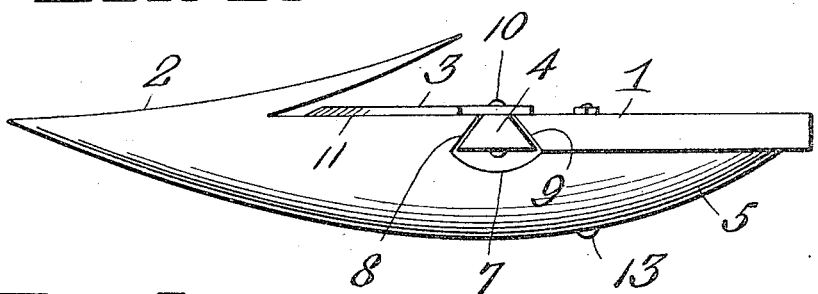
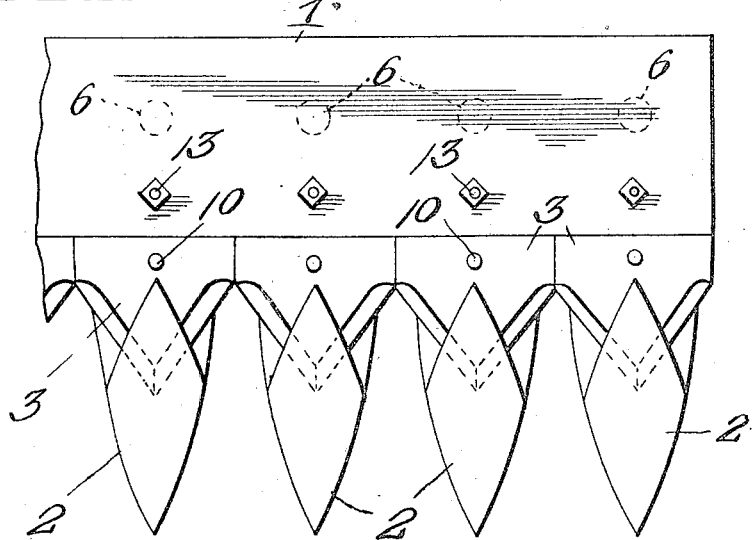
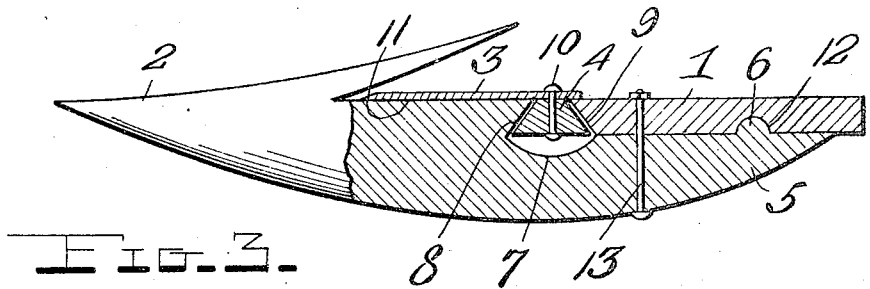
Witnesses
Chas. L. Griestauer.
H. F. McQuay.
Inventor
Albert Dahms
By Watson E. Coleman
Attorney

UNITED STATES PATENT OFFICE.

ALBERT DAHMS, OF HETLAND, SOUTH DAKOTA, ASSIGNOR OF ONE-THIRD TO EDWARD STIEF, OF WINONA, MINNESOTA.

CUTTER-BAR.

951,985.        Specification of Letters Patent.       Patented Mar. 15, 1910.

Application filed September 18, 1909. Serial No. 518,366.

*To all whom it may concern:*

Be it known that I, ALBERT DAHMS, a citizen of the United States, residing at Hetland, in the county of Kingsbury and State of South Dakota, have invented certain new and useful Improvements in Cutter-Bars, of which the following is a specification, reference being had to the accompanying drawings.

This invention relates to improvements in cutter bars for mowing and reaping machines.

The object of the invention is to provide an improved cutter bar which will dispense with the plates now commonly used and which frequently become clogged up and produce friction on the sickle.

With the above and other objects in view, the invention consists of the novel construction, combination and arrangement of parts, hereinafter fully described and claimed, and illustrated in the accompanying drawings in which—

Figure 1 is an end view of my improved cutter bar and the coacting parts. Fig. 2 is a top plan view, and Fig. 3 is a vertical section.

Referring more particularly to the drawings, 1 denotes a cutter bar, 2 the guard fingers, 3 the sickle blades and 4 the sickle bar. Each of the guard fingers 2 has a longitudinally curved bottom and a top formed at its forward portion with the usual recess for the sickle blade 3. The rear end 5 of the guard finger 2 has a flat upper surface on the intermediate portion of which is formed an upwardly projecting semi-spherical-shaped lug 6. Formed in the intermediate portion of the guard finger 2 is a transverse recess 7 which receives the sickle bar 4, and which has its forward wall inclined downwardly and forwardly as at 8. The cutter bar 1, extends transversely across the rear portions 5 of the several guard fingers and has its forward edge 9 inclined downwardly and rearwardly and disposed opposite to the inclined wall 8 of the recess 7, as clearly shown in Fig. 3. The cutter bar 1 has formed in its bottom face a longitudinal series of semispherical-shaped sockets 12 which are adapted to receive the lugs or projections 6 on the guard fingers. The latter and the cutter bar 1 are also formed with registering vertical openings for the reception of removable bolts 13, whereby the guard fingers are detachably connected to the cutter bar, the engagement of the lugs 6 with the socket 12 preventing shifting or turning movement of the guard fingers, as will be readily understood. The sickle bar 4 has the blades 3 united to its upper surface by means of rivets 10, said blades abutting each other whereby they will be prevented from turning on said rivets. The front and rear lingitudinal edges of the cutter bar 4 are beveled downwardly in opposite directions to correspond with the beveled surfaces 8, 9, on the guard fingers and cutter bar respectively, whereby the sickle bar will be guided in its sliding movement and effectively retained in position in the transverse recesses 7.

From the foregoing it will be seen that the invention does away with the use of plates above the sickle as in the cutting devices now in general use on mowing and reaping machines, and that the top of the sickle is left entirely free to prevent clogging up and to overcome friction on the sickle.

Having thus described the invention what I claim is:

The herein described cutting device comprising a cutter bar formed with a downwardly and rearwardly inclined front edge and having in its bottom face a longitudinal series of semispherical-shaped sockets, a plurality of guard fingers having longitudinally curved bottom portions and rear portions formed with flat, upper surfaces to engage the bottom of the cutter bar, and also formed with upstanding semispherical lugs to enter said sockets in the cutter bar, said guard fingers being formed intermediate their ends with transverse recesses having their front walls inclined downwardly and forwardly to oppose the inclined front edge of the cutter bar, sickle blades to work through the guard fingers, a sickle bar arranged for sliding movement in the transverse recesses of the guard fingers and formed with downwardly beveled front and rear edges, rivets uniting the sickle blades to the top of the sickle bar, and removable bolts passed through the rear portions of the guard fingers and through the cutter bar to detachably unite the same, the engagement of said lugs with said sockets preventing the guard fingers from turning on said bolts.

In testimony whereof I hereunto affix my signature in the presence of two witnesses.

ALBERT DAHMS.

Witnesses:
 HENRY MANCH,
 M. D. MARTIN.